(12) United States Patent
Beck et al.

(10) Patent No.: US 8,273,813 B2
(45) Date of Patent: Sep. 25, 2012

(54) FIRE EXTINGUISHING AND/OR FIRE RETARDING COMPOSITIONS

(75) Inventors: Martin Beck, Maxdorf (DE); Samantha Champ, Ludwigshafen (DE); Markus Tönnessen, Ludwigshafen (DE); Antje Ziemer, Mannheim (DE); Gerd Goebel, Frankfurt (DE); Matthias Pfeiffer, Boehl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 853 days.

(21) Appl. No.: 11/667,887

(22) PCT Filed: Nov. 21, 2005

(86) PCT No.: PCT/EP2005/012427
§ 371 (c)(1),
(2), (4) Date: May 16, 2007

(87) PCT Pub. No.: WO2006/056379
PCT Pub. Date: Jun. 1, 2006

(65) Prior Publication Data
US 2007/0289752 A1     Dec. 20, 2007

Related U.S. Application Data

(60) Provisional application No. 60/630,892, filed on Nov. 24, 2004.

(30) Foreign Application Priority Data

Nov. 24, 2004 (DE) .......................... 10 2004 056 830

(51) Int. Cl.
*C02F 1/52* (2006.01)

(52) U.S. Cl. .................. 524/321; 169/47; 252/2; 252/3; 252/601; 8/490

(58) Field of Classification Search ........................ 252/2
See application file for complete search history.

(56) References Cited

U.S. PATENT DOCUMENTS

| 1,278,716 | A | | 9/1918 | Mork |
|---|---|---|---|---|
| 3,229,769 | A | | 1/1966 | Bashaw et al. |
| 4,234,044 | A | * | 11/1980 | Hollan et al. .................. 169/14 |
| 4,756,839 | A | * | 7/1988 | Curzon et al. .................... 252/2 |
| 4,888,136 | A | | 12/1989 | Chellapa et al. |
| 5,849,210 | A | | 12/1998 | Pascente et al. |
| 5,945,025 | A | | 8/1999 | Cunningham |
| 6,136,873 | A | * | 10/2000 | Hahnle et al. .................. 521/62 |
| 2003/0212177 | A1 | | 11/2003 | Vandersall et al. |

FOREIGN PATENT DOCUMENTS

| DE | 1 302 520 | 10/1970 |
|---|---|---|
| DE | 35 25 684 | 10/1986 |
| EP | 0 059 178 | 9/1982 |
| EP | 0 426 178 | 5/1991 |
| JP | 01166777 | 6/1989 |
| WO | WO-88/00482 | 1/1988 |
| WO | WO-03/018695 | 3/2003 |

OTHER PUBLICATIONS

International Search Report in PCT/EP2005/012427 dated Jul. 31, 2006.

* cited by examiner

*Primary Examiner* — Doris Lee
(74) *Attorney, Agent, or Firm* — Marshall, Gerstein & Borun LLP

(57) ABSTRACT

The invention concerns fire-extinguishing and/or fire-retarding compositions comprising at least one water-absorbing polymer and at least one alkali metal salt of a nonpolymeric saturated carboxylic acid, processes for their production and the use of the compositions for firefighting or as fire-retarding coatings.

24 Claims, No Drawings

FIRE EXTINGUISHING AND/OR FIRE RETARDING COMPOSITIONS

CROSS-REFERENCE TO RELATED APPLICATIONS

This is the U.S. national phase application of International Application No. PCT/EP2005/012427, filed Nov. 21, 2005, which claims the benefit of German patent application No. 10 2004 056 830.8, filed Nov. 24, 2004, and U.S. provisional patent application No. 60/630,892, filed Nov. 24, 2004.

The present invention relates to fire-extinguishing and/or fire-retarding compositions, processes for their production and also the use of the compositions for firefighting or as fire-retarding coatings.

Further embodiments of the present invention are discernible from the claims, the description and the examples. It will be appreciated that the hereinbefore identified and the hereinafter still to be more particularly described features of the subject matter of the present invention are usable not only in the particular combination specified but also in other combinations without leaving the realm of the present invention.

Firefighters have long utilized solutions of inorganic salts, for example alkali metal or alkaline earth metal salts of carbonic acid, phosphoric acid or boric acid. The salts augment the extinguishing action of water and are used as concentrated solutions. The salts are effective because they release inert gases, for example carbon dioxide from carbonates, or melt and so form an air-impervious layer on combustible materials. In either case, access of air to combustible material is controlled. The disadvantage with this approach is the formation of a coating which is later difficult to remove. They have no cooling effect and are barely able to extinguish burning matter, since the latter, like water as well, runs off very rapidly. Any protective effect is solely due to preceding and repeated spraying of objects. A salt solution does not adhere to smooth or waxy objects, such as leaves, planks or glass panes, to any significant extent, if at all.

The use of salts of organic carboxylic acids, for example oxalic acid, tartaric acid or citric acid, in firefighting has been known since the 1970s. In contradistinction to inorganic salts mentioned above, coatings are easy to remove after the fire has been extinguished. Examples of the use of salts of organic carboxylic acids in firefighting are identified in DE-C 13 02 520, DE-A 35 25 684, EP-A 059 178, EP-A 426 178, U.S. Pat. No. 1,278,718, U.S. Pat. No. 4,888,136, U.S. Pat. No. 5,945,025 and WO 88/00482.

DE-C 13 02 520 discloses the use of alkali metal salts of oxy carboxylic acids in dry extinguishing powders.

DE-A 35 25 684 describes solutions consisting of citric acid/citrate, potassium hydroxide and water that are useful for firefighting and for impregnating combustible materials. More particularly, the solution is said to be capable of binding acidic gases generated in a fire.

EP-A 059 178 describes the use of concentrated solutions of alkali metal salts of citric acid as extinguishing compositions.

EP-A 426 178 discloses fire-retardant asphalt compositions, the fire-retarding component comprising potassium citrate and a silicone polymer.

U.S. Pat. No. 1,278,718 discloses compositions consisting of concentrated solutions of alkali metal salt of citric acid and alkali metal bicarbonate, as filling for fire extinguishers.

U.S. Pat. No. 4,888,136 describes the use of aluminum salts of citric acid and of lactic acid for fire-retarding impregnations of cellulosic fibers.

U.S. Pat. No. 5,945,025 describes compositions of potassium citrate and sodium bicarbonate for firefighting.

WO 88/00482 discloses compositions of matter for firefighting and for producing fire-retarding coatings based on alkali metal salts of citric acid.

The compositions mentioned above have a pronounced long-term effect; that is, the compositions can be applied as aqueous solutions and retain their fire-retarding effect even after drying.

A further problem in firefighting is that the water used for extinguishing drains away and hence can only partly be used for cooling the source of the fire. It is therefore necessary to use a very large amount of water for a very long time, and consequently the damage due to water is often greater than the damage purely due to the fire. In addition, moreover, large amounts of contaminated extinguishing water can arise, which does not make ecologists very happy.

The use of hydrogels is proposed as a solution to this problem for more than 35 years, for example in U.S. Pat. No. 3,229,769 and U.S. Pat. No. 5,849,210. The hydrogels in question are produced from a water-absorbing polymer and water. The hydrogel binds the water and so stops the water from flowing away from the source of the fire.

Because hydrogels are capable of maintaining a large amount of water near the fire, hydrogels have a good immediate extinguishing effect. In contrast, the long-term effect of hydrogels is poor. Hydrogels can dry and thereby rapidly lose their effect. The remaining saltlike dried hydrogels have a very low fire-retarding effect.

It is common knowledge that the swellability of water-absorbing polymers is very much dependent on the salt content of the aqueous solution used as swellant. This correlation is described for example in Ullmann's Encyclopedia of Industrial Chemistry, 6th edition, volume 35, pages 81 and 82. For instance, the water swellability of a water-absorbing polymer decreases by 70% in a 1% by weight aqueous sodium chloride solution.

It is because of this peculiarity of water-absorbing polymers that the combination of water-absorbing polymers with fire-retarding salts to form fire-retarding compositions having a good immediate extinguishing effect and a good long-term effect did not appear to be possible.

The present invention had for its object to provide fire-retarding compositions having a. good immediate extinguishing effect and a good long-term effect.

We have found that this object is achieved by novel fire-retarding compositions comprising a) at least one water-absorbing polymer,
b) at least one alkali metal salt of a nonpolymeric saturated carboxylic acid,
c) if appropriate at least one thickener,
d) if appropriate water,
e) if appropriate at least one biocide,
f) if appropriate at least one solubilizer,
g) if appropriate at least one colorant,
h) if appropriate at least one opacifying assistant, and
i) if appropriate a foaming agent.

The water-absorbing polymers which are usable in the compositions of the present invention are not subject to any restriction. The production of water-absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, volume 35, pages 73 to 103.

Centrifuge retention capacity of water-absorbing polymers is typically not less than 15 g/g, preferably not less than 20 g/g and more preferably not less than 25 g/g. Centrifuge retention capacity is determined according to EDANA's recommended test method No. 441.2-02 "Centrifuge retention capacity" (EDANA=European Disposables and Nonwovens Association).

Water-absorbing polymers may be prepared by reacting hydrophilic ethylenically unsaturated monomers in the presence of crosslinkers to form a base polymer. The polymerization may also be carried out in the presence of a suitable grafting base, as described in U.S. Pat. No. 5,041,496. The reaction may be carried out for example as a free-radical solution polymerization or inverse suspensions polymerization. Free-radical solution polymerization is preferred.

Useful monomers include for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers.

Water-absorbing polymers are crosslinked, i.e., the polymerization is carried out in the presence of compounds having two or more polymerizable groups which can be free-radically interpolymerized into the polymer network.

Useful crosslinkers include for example ethylene glycol dimethacrylate, diethylene glycol diacrylate, allyl methacrylate, trimethylolpropane triacrylate, triallylamine, tetraallyloxyethane, as described in EP-A 530 438, di- and triacrylates, as described in EP-A 547 847, EP-A 559 476, EP-A 632 068, WO 93/21237, WO 03/104299, WO 03/104300, WO 03/104301 and in German patent application 103 31 450.4, mixed acrylates which, as well as acrylate groups, comprise further ethylenically unsaturated groups, as described in German patent applications 103 31 456.3 and 103 55 401.7, or crosslinker mixtures as described for example in DE-A 195 43 368, DE-A 196 46 484, WO 90/15830 and WO 02/32962.

Polymerizable groups are preferably selected from the group consisting of allyl, acryloyloxy and methacryloyloxy. Allyl ether and allylamine groups are particularly preferred. Allyl ether groups are very particularly preferred. Crosslinkers may comprise two, three, four or more, preferably two, three or four and more preferably three or four polymerizable groups. Polymerizable groups in a crosslinker may be the same or different in that for example a crosslinker may comprise at least one acrylic ester group and at least one allyl ether group, at least one acrylic ester group and at least one allylamine group, at least one methacrylic ester group and at least one allyl ether group, at least one methacrylic ester group and at least one allylamine group, at least two acrylic ester groups or at least two methacrylic ester groups, preferably at least one allyl ether group and at least one allylamine group or at least two allylamine groups, more preferably at least two allyl ether groups.

Preferred crosslinkers are ethylene glycol diallyl ether, diethylene glycol diallyl ether, polyethylene glycol diallyl ether, propylene glycol diallyl ether, dipropylene glycol diallyl ether, polypropylene glycol diallyl ether, tetraallyloxyethane, trimethylolpropane diallyl ether, trimethylolpropane triallyl ether, pentaerithritol triallyl ether and pentaerithritol tetraallyl ether. Particularly preferred crosslinkers are tetraallyloxyethane, trimethylolpropane diallyl ether, trimethylolpropane triallyl. ether, pentaerithritol triallyl ether and pentaerithritol tetraallyl ether.

The preparation of a suitable base polymer as well as further suitable hydrophilic ethylenically unsaturated monomers and crosslinkers are described in DE-A 199 41 423, EP-A 686 650, WO 01/45758 and WO 03/104300.

The reaction is preferably carried out in a kneader as described for example in WO 01/38402 or a belt reactor as described for example in EP-A 955 086.

The acid groups of the hydrogels obtained are typically partly neutralized, the degree of neutralization being preferably in the range from 25 to 85 mol %, more preferably in the range from 40 to 75 mol %, even more preferably in the range from 51 to 69 mol %, still more preferably in the range from 55 to 65 mol %, yet still more preferably in the range from 53 to 63 mol % and most preferably in the range from 59 to 61 mol %, and customary neutralizing agents may be used, for example ammonia, amines, such as ethanolamine, diethanolamine, triethanolamine or dimethylaminoethanolamine, preferably alkali metal hydroxides, alkali metal oxides, alkali metal carbonates or alkali metal bicarbonates and also mixtures thereof, and although sodium and potassium are particularly preferred among alkali metals very particular preference is given to potassium hydroxide, potassium carbonate or potassium bicarbonate and also mixtures thereof. Typically, neutralization is achieved by admixing the neutralizing agent as an aqueous solution or else preferably as a solid.

Neutralization may be carried out prior to polymerization (at the monomer solution stage) or after polymerization (at the hydrogel stage). But it is also possible to add a portion of the neutralizing agent to the monomer solution and to set the desired final degree of neutralization only after polymerization, at the hydrogel stage. The monomer solution may be neutralized by admixing the neutralizing agent. The hydrogel may be mechanically comminuted, by a meat grinder for example, in which case the neutralizing agent may be sprayed, sprinkled or poured on and then carefully mixed in. To this end, the gel mass obtained may be repeatedly minced for homogenization. Preferably, neutralization is carried out, at least to some extent, after polymerization. For example, up to 40 mol %, preferably 10 to 30 mol % and more preferably 15 to 25 mol % of the acid groups may be neutralized prior to polymerization by adding a portion of the neutralizing agent to the monomer solution, and the desired final degree of neutralization is only set after polymerization, at the hydrogel stage.

The proportion of neutralized acid groups of the if appropriate postneutralized hydrogel which comprise potassium ions as counter-ion is preferably not less than 15 mol %, more preferably not less than 33 mol %, even more preferably not less than 80 mol % and most preferably not less than 95 mol %.

The neutralized hydrogel is then dried with a belt or drum dryer until the residual moisture content is preferably below 10% by weight and especially below 5% by weight, the water content being determined according to EDANA's recommended test method No. 430.2-02 "Moisture content" (EDANA=European Disposables and Nonwovens Association). The dried hydrogel is subsequently ground and sieved, useful grinding apparatus typically including roll mills, pin mills or swing mills. The particle size of the sieved, dry hydrogel is preferably below 1000 µm, more preferably below 900 µm and most preferably below 800 µm and preferably above 100 µm, more preferably above 150 µm and most preferably above 200 µm.

Very particular preference is given to a particle size (sieve fraction) ranging from 106 to 850 µm. Particle size is determined according to EDANA's recommended test method No. 420.2-02 "Particle size distribution" (EDANA=European Disposables and Nonwovens Association).

The base polymers are preferably surface postcrosslinked subsequently. Useful postcrosslinkers include compounds comprising two or more groups capable of forming covalent bonds with the carboxylate groups of the hydrogel. Useful compounds include for example alkoxysilyl compounds, polyaziridines, polyamines, polyamidoamines, di- or polyglycidyl compounds as described in EP-A 083 022, EP-A 543 303 and EP-A 937 736, di- or polyfunctional alcohols as described in DE-C 33 14 019, DE-C 35 23 617 and EP-A 450 922, or β-hydroxyalkylamides as described in DE-A 102 04 938 and U.S. Pat. No. 6,239,230.

Useful surface postcrosslinkers are further said to include by DE-A 40 20 780 cyclic carbonates, by DE-A 198 07 502.2 oxazolidone and its derivatives, such as 2-hydroxyethyl-2-oxozolidone, by DE-A 198 07 992 bis- and poly-2-oxazolidinones, by DE-A 198 54 573 2 oxotetrahydro-1,3-oxazine and its derivatives, by DE-A 198 54 574 N-acyl-2-oxazolidones, by DE-A 102 04 937 cyclic ureas, by German patent application 103 34 584.1 bicyclic amide acetals, by EP-A 1 199 327 oxetanes and cyclic ureas and by WO 03/031482 morpholine-2,3-dione and its derivatives.

Postcrosslinking is typically carried out by spraying a solution of the surface postcrosslinker onto the hydrogel or onto the dry base-polymeric powder. After spraying, the polymeric powder is thermally dried, and the crosslinking reaction may take place not only before but also during drying.

The spraying with a solution of the crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex® mixers, Nauta® mixers, Processall® mixers and Schugi® mixers.

Contact dryers are preferable, shovel dryers more preferable and disk dryers. most preferable as apparatus in which thermal drying is carried out. Useful dryers include for example Bepex® dryers and Nara® dryers. Fluidized bed dryers can be used as well.

Drying may take place in the mixer itself, by heating the jacket or introducing a stream of warm air. It is similarly possible to use a downstream dryer, for example a tray dryer, a rotary tube oven or a heatable screw. But it is also possible for example to utilize an azeotropic distillation as a drying process.

Preferred drying temperatures are in the range from 50 to 250° C., preferably in the range from 50 to 200° C. and more preferably in the range from 50 to 150° C. The preferred residence time at this temperature in the reaction mixer or dryer is below 30 minutes and more preferably below 10 minutes.

The base polymer is preferably lightly postcrosslinked; that is, postcrosslinker concentration is typically below 0.3% by weight, preferably below 0.2% by weight, more preferably below 0.15% by weight and most preferably below 0.1% by weight, all based on base polymer. To achieve a sufficient degree of postcrosslinking, the amount of postcrosslinker used is preferably above 0.01% by weight, more preferably above 0.025% by weight and most preferably above 0.05% by weight, all based on base polymer.

Absorption under a pressure of 2070 Pa (0.3 psi) of lightly postcrosslinked water-absorbing polymers is typically not more than 25 g/g, preferably not more than 23 g/g and more preferably not more than 21 g/g, and their absorption under a pressure of 4830 Pa is not more than 18 g/g, preferably not more than 15 g/g and more preferably not more than 12 g/g. Absorption under pressure is determined according to EDANA's recommended test method No. 442.2-02 "Absorption under pressure" (EDANA=European Disposables and Nonwovens Association).

The degree of postcrosslinking is used to control the tackiness of the water-absorbing polymer. When the degree of postcrosslinking is too low, the particles adhere to each other too much in the swollen state and tend to cake together. When the degree of postcrosslinking is too high, the swollen particles completely lose their tackiness. But optimized tackiness is advantageous for use in firefighting, since the particles are capable of clinging without further auxiliaries to the combustible material to be protected.

Useful alkali metal salts of nonpolymeric saturated carboxylic acids for inclusion in the compositions of the present invention preferably comprise carboxylate groups whose corresponding carboxylic acids have a 23° C. pKa value of below 7, more preferably below 6 and most preferably below 5, the pKa value being preferably above 2, more preferably above 3 and most preferably above 4.

By carboxylic acids are meant mono-, di-, tri-, tetra- and penta- and polycarboxylic acids and it is the averaged pKa value which is applicable.

Nonpolymeric carboxylic acids are carboxylic acids having a molecular weight of below 2000 g/mol, preferably of below 1000 g/mol and more preferably of below 500 glmol.

The atomic ratio of carbon to alkali metal in the utilized alkali metal salt of a nonpolymeric carboxylic acid should be below 10:1, preferably below 6:1, more preferably below 3:1 and preferably not less than 1:1, more preferably not less than 1.5:1 and most preferably not less than 1.8:1.

The atomic ratio of oxygen to carbon in the utilized alkali metal salt of a nonpolymeric carboxylic acid should be not less than 0.85:1, preferably not less than 1:1 and more preferably not less than 1.15:1.

Salts meeting the abovementioned conditions contain little by way of carbon in relation to alkali metal and this carbon has a high average oxidation state; that is, the stoichiometry of the salts is such that their combustion produces little energy but a lot of carbon dioxide.

Salts of saturated carboxylic acids are carboxylic acids which are devoid of ethylenically unsaturated and hence free-radically polymerizable groups. Salts of unsaturated carboxylic acids, i.e., ethylenically unsaturated carboxylic acids, are reactive and may, through secondary reactions, reduce the stability of the fire-retarding compositions in storage.

Preference is given to alkali metal salts of oxalic acid, of gluconic acid, of citric acid and also of tartaric acid. Salts of citric acid are particularly preferred.

The efficacy of the alkali metal salts increases in the order of lithium, sodium, potassium, cesium and rubidium. Salts of sodium and of potassium are preferred for cost reasons. Potassium caboxylates are very particularly preferred.

Tripotassium citrate is the preferred alkali metal salt.

Useful alkali metal salts of nonpolymeric carboxylic acids for inclusion in the compositions of the present invention surprisingly have but a minimal effect on the swellability of the water-absorbing polymer used. Typically, the water-absorbing polymers used have a centrifuge retention capacity of not less than 5 g/g, preferably not less than 10 g/g and more preferably not less than 15 g/g, the test being carried out analogously to EDANA's recommended test method No. 442.2-02 "Absorption under pressure" (EDANA=European Disposables and Nonwovens Association) using a 10% by weight aqueous solution of the utilized alkali metal salt of a nonpolymeric carboxylic acid.

The fire-retarding compositions of the present invention have a good long-term effect and, in the water-swollen state, a good immediate extinguishing effect. The compositions of the present invention are used together with water. This mixing can take place before or during their use.

The compositions of the present invention are useful as an extinguishant for firefighting. For example, an aqueous preparation may be set and kept in readiness for firefighting use. However, it is also possible for the aqueous preparation not to be produced until it is produced, by diluting with water, during a firefighting deployment.

But the compositions of the present invention are also useful as fire-retarding coatings for garments or parts of buildings. In this case, it is possible for the coated garments not to be moistened until immediately before use. Garments thus treated are of low flammability due to the large amount of bound water. Coated parts of buildings may similarly not be wetted with water until during extinguisher deployment. This ensures that the extinguishing water does not run off, but becomes bound to hazarded regions.

The ratio of water-absorbing polymer to alkali metal salt of a nonpolymeric carboxylic acid in the composition of the present invention may be between 100:1 to 1:1000 and is typically in the range from 1:1 to 1:100, preferably in the range from 1:2 to 1:50, more preferably in the range from 1:4 to 1:25 and most preferably in the range from 1:8 to 1:15.

An excessively low fraction of water-absorbing polymer reduces the immediate extinguishing performance of the aqueous preparation, and an excessively high fraction increases the viscosity too much. When the fire-retarding composition is used for coating textile materials, building materials or structural components, therefore, comparatively high fractions of water-absorbing polymer may be preferable.

In a preferred embodiment, the fire-retarding composition further comprises water. The water content is typically not less than 55% by weight, preferably not less than 65% by weight, more preferably not less than 75% by weight and most preferably not less than 85% by weight and preferably not more than 95% by weight and more preferably not more than 90% by weight, all based on the fire-retarding composition.

In an advantageous embodiment, the fire-retarding composition further comprises a thickener. A thickener enhances the stability of the aqueous preparation in storage and inhibits sedimentation of the swollen water-absorbing polymer. At the same time, the aqueous preparation should still be pumpable.

Useful thickeners are natural organic thickeners, such as agar, carageenan, tragacanth, xanthan, gum arabic, alginates, pectins, polyoses, guar flour, carob bean flour, starch, dextrins, gelatin or casein, modified organic materials, such as carboxymethylcellulose, wholly synthetic organic thickeners such as polyacrylic compounds, polymethacrylic compounds, vinyl polymers, polycarboxylic acids, polyethers, polyimines or polyamides, and also inorganic thickeners, such as polysilicas or clay minerals.

The concentration of thickener in the aqueous preparation is preferably not more than 2% by weight, more preferably not more than 1% by weight and most preferably not more than 0.5% by weight and preferably not less than 0.01% by weight, more preferably not less than 0.05% by weight and most preferably not less than 0.1% by weight, all based on the aqueous preparation.

The viscosity of the aqueous preparation is preferably not less than 100 mPas, more preferably not less than 200 mPas and most preferably not less than 500 mPas and preferably not more than 5000 mPas, more preferably not more than 2000 mPas and most preferably not more than 1 000 mPas.

The compositions of the present invention may further comprise biocides and solubilizers.

Bibcides increase stability in storage, especially of the aqueous preparations.

It is further possible to add surface area enhancers, such as fibers or pyrogenic silica.

It is also advantageous to add colorants with or without opacifying assistants. Opacifying assistants make the fire-retarding composition cloudy and prevent any interaction between the color of the added colorant used and the background color. This makes it possible for example in the fighting of forest fires to easily see areas which have already been covered with extinguishant. Preferably, the fire-retarding compositions comprise at least one colorant and at least one opacifying assistant.

The preferred colorant is mica, especially natural mica. Mica also acts as an opacifying assistant, so that a separate opacifying assistant can be omitted. Areas which have already been treated are easier to identify, for example from the air. In addition, mica is capable of reflecting direct thermal radiation.

The concentration of the dye in the fire-retarding composition is preferably in the range from 0.005% to 10% by weight, more preferably in the range from 0.01% to 5% by weight and most preferably in the range from 0.015% to 2% by weight.

Of particular advantage are dyes, food dyes for example, which fade as the fire-retarding composition dries and gradually decompose or are otherwise easily removable, for example by flushing with water.

Useful opacifying assistants include inorganic compounds having a solubility of not less than 0.005 g in 100 ml of water at 25° C., such as chalk, calcium carbonate, titanium dioxide.

Useful opacifying assistants, however, also include polymers or copolymers which are dispersible in the fire-retarding composition, examples being styrene-butadiene copolymers, styrene-vinylpyrrolidone copolymers, styrene-butadiene-acrylonitrile copolymers, polyacrylic acid, polyvinyl acetate, polyvinyl acrylate, starch, polystyrene, polyethyleneimine, polyethylene or polyvinyl alcohol.

It will be appreciated that mixtures of various opacifying assistants may be used as well.

The concentration of opacifying assistant in the fire-retarding composition is preferably in the range from 0.005% to 10% by weight, more preferably in the range from 0.01% to 5% by weight and most preferably in the range from 0.015% to 2% by weight.

Useful foaming agents include multipurpose foaming agents, protein foaming agents and fluorosurfactant foaming agents, especially multipurpose foaming agents and fluorosurfactant foaming agents. These foaming agents will be known to one skilled in the art, for example from EN 3. When the composition of the present invention is used, the foam is produced in a conventional manner by incorporating air by mixing.

The combination of a swollen hydrogel with a foam is particularly advantageous to extinguish flammable liquids, especially flammable high-viscosity liquids, such as oils, paraffins, bitumen, molten plastics and fats.

When flammable liquids are extinguished using extinguishing foam, the foam interrupts the supply of oxygen. However, a portion of the flammable liquid may vaporize and reignite at hot surfaces above the foam layer. These surfaces are sufficiently cooled by the swollen hydrogel so that ignition can no longer occur.

When extinguishing foam is used to extinguish flammable high-viscosity oils, such as thermal fluid oils or fats, the foam likewise acts to interrupt the oxygen supply, but the foam is destroyed by the high temperature of the oil. When a swollen hydrogel is concurrently used as an extinguishing medium, the hydrogel will sink through the foam layer and cool the oil, for example through delayed water evaporation to below the flashpoint. The presence of an alkali metal salt augments the extinguishing performance in relation to fat fires. Fat saponification forms soaps which render the fat low flammable. In addition, the soaps formed expand and so interrupt the oxygen supply.

A preferred composition according to the present invention comprises
a) from 0.1% to 5% by weight, preferably from 0.5% to 2% by weight and more preferably from 0.8% to 1.2% by weight of at least one water-absorbing polymer,
b) from 1% to 65% by weight, preferably from 5% to 40% by weight and more preferably from 8% to 12% by weight of at least one alkali metal salt of a nonpolymeric saturated carboxylic acid,
c) if appropriate from 0.01% to 2% by weight, preferably from 0.05% to 1% by weight and more preferably from 0.1% to 0.5% by weight of at least one thickener,
d) from 30% to 95% by weight, preferably from 55% to 92% by weight and more preferably from 85% to 90% by weight of water,
e) if appropriate at least one biocide,
f) if appropriate at least one solubilizer,
g) if appropriate at least one colorant,
h) if appropriate at least one opacifying assistant, and
i) if appropriate a foaming agent.

Components a) to i) sum to not more than 100% by weight.

When tested with softwood shavings 1.5 to 5 mm in size in the Brandschacht test furnace of German standard specification DIN 4102, the compositions of the present invention typically give a light absorption of below 50% xmin, preferably of below 25% xmin and more preferably of below 10% xmin and surface ignition after not less than 10 s, preferably after not less than 20 s and more preferably after not less than 30 s, the softwood shavings being mixed with the same weight of the composition according to the present invention and dried at 80° C. Light absorption is a measure of smoke evolution and ignition time is a measure of the (long term) fire-retarding effect. Softwoods are woods of fast-growing trees, especially coniferous trees, such as pine or spruce.

The compositions are producible by mixing the components a) and b) and also if appropriate the further components c) to i). The order of mixing is discretionary. It is advantageous to produce aqueous preparations by mixing the components other than water into water. It is particularly preferable to add the components a) and c) last.

But it is also possible to admix component i) last, for example through a suitable Venturi nozzle during actual firefighting.

The compositions of the present invention may further comprise binders or dustproofers. Binders or dustproofers which are particularly suitable are polyethylene glycols having a molecular weight from 100 to 20 000 g/mol, polyglycerol, 3- to 100-tuply ethoxylated polyols, such as trimethylolpropane, glycerol, sorbitol and neopentylglycol, of which polyethylene glycols having a molecular weight from 200 to 300 g/mol are preferred.

A foaming agent can be utilized as a dustproofing and/or adhesive agent.

The compositions of the present invention are very useful for firefighting and for producing fire-retarding coatings.

The compositions of the present invention can be used for example for firefighting in forests, tire warehouses, landfill sites, coal stocks, timberyards and mines, preferably for fighting forest fires from the air, for example by airplanes and helicopters. But other firefighting implements as well such as hand- or motor-driven fire pumps.

Conventional compositions for fighting forest fires from the air atomize and form a mist when applied from the air. The resulting fine droplets descend only very slowly, if at all, to the ground. At high temperatures and low relative humidity, there is in addition a noticeable degree of evaporation. As a result, only a small proportion of the composition will have any effect at ground level. The aqueous compositions of the present invention are free of this disadvantage. Since the aqueous compositions of the present invention are distinctly more difficult to turn into a mist, distinctly greater sprayable distances are achieved with the aqueous compositions of the present invention, using a C-pipe for example.

It is preferable for textile materials, such as items of clothing or stage decorations, to be coated with the compositions according to the present invention.

It is preferable for building materials and/or structural components, such as wood panels, to be coated with the compositions of the present invention. The building materials and/or structural components coated with the composition of the present invention are distinctly less flammable than uncoated building materials and/or structural components. It is possible for example for building materials and/or structural components which are classified as "highly flammable" according to German standard specification DIN 4102 to be rated as "low flammable" or "nonflammable" after coating according to the present invention.

The compositions are useful as an extinguishant for firefighting, preferably for fires of classes A, B, C and D, more preferably for fires of classes A, B and C and most preferably for fires of classes A and B. For example, an aqueous preparation may be set and kept in readiness for firefighting use. However, it is also possible for the aqueous preparation not to be produced until it is produced, by diluting with water, during a firefighting deployment.

The fire-extinguishing and/or fire-retarding composition of the present invention are further useful as an extinguishant in extinguishers and/or extinguishing systems and also via existing fire extinguishing pumps and fittings. Extinguishers are for example portable and/or mobile fire extinguishers. Extinguishing systems are fixed installations, such as sprinkler systems.

The compositions of the present invention are effective even in the dry state (long-term action) in giving a distinctly delayed ignition on the surface of a flammable material (ignition time), an appreciably reduced smoke evolution (light absorption) and almost no afterglow (antismoldering effect).

The compositions of the present invention are easily removable by simply flushing with water before or after use.

The citrate salts preferably utilized in the compositions of the present invention are very readily biodegradable. This is advantageous especially in relation to the fighting of forest fires where the fire-extinguishing and/or fire-retarding composition is applied to large areas. The compositions of the present invention are similarly free of the disadvantages of the ammonium compounds previously used in forest fire fighting, which may at the same time have an adverse effect as fertilizers in watercourses.

Furthermore, the compositions of the present invention are very freeze resistant. For instance, it is possible to obtain an aqueous composition according to the present invention which is still sprayable at −30° C. and constitutes a highly viscous but still plastically deformable mass at −60° C. This avoids containers bursting at very low temperatures.

Furthermore, the compositions of the present invention are not corrosive, especially not with regard to aluminum. Since airplanes consist predominantly of aluminum, this is of particular importance in relation to the fighting of forest fires from the air.

Test Methods

Centrifuge Retention Capacity (CRC)

Centrifuge retention capacity was determined similarly to the centrifuge retention capacity test method No. 441.2-02 recommended by EDANA (European Disposables and Nonwovens Association).

To determine centrifuge retention capacity, 0.2000±0.0050 g of dried water-absorbing polymer (particle fraction 106 to 850 μm) were weighed into a teabag 60×85 mm in size, which was subsequently sealed shut. The teabag was placed for 30 minutes in an excess of 0.9% by weight sodium chloride solution or a 10% by weight aqueous solution of an alkali metal salt of a nonpolymeric carboxylic acid (at least 0.83 l of solution/1 g of polymer powder). The teabag was subsequently centrifuged at 250 G for 3 minutes. The amount of liquid retained by the water-absorbing polymer is determined by weighing the centrifuged teabag.

Absorbency Under Load (AUL) 0.7 Psi (4830 Pa)

Absorbency under load was determined similarly to the Absorption under pressure test method No. 442/.2-02 recommended by EDANA (European Disposables and Nonwovens Association).

The measuring cell for determining the AUL 0.7 psi value is a Plexiglas cylinder 60 mm in internal diameter and 50 mm in height. Adhesively attached to its underside is a stainless steel sieve bottom having a mesh size of 36 μm. The measuring cell further includes a plastic plate having a diameter of 59 mm and a weight which can be placed in the measuring cell together with the plastic plate. The plastic plate and the weight together weigh 1344 g. AUL 0.7 psi is determined by determining the weight of the empty Plexiglas cylinder and of the plastic plate and recording it as $W_0$. Then 0.900±0.005 g of swellable hydrogel-forming polymer (particle size distribution 150-850 μm) is weighed into the Plexiglas cylinder and distributed very uniformly over the stainless steel sieve bottom. The plastic plate is then carefully placed in the Plexiglas cylinder, the entire unit is weighed and the weight is recorded as $W_a$. The weight is then placed on the plastic plate in the Plexiglas cylinder. A ceramic filter plate 120 mm in diameter and 10 mm in height and 0 in porosity is then placed in the middle of a Petri dish 200 mm in diameter and 30 mm in height and sufficient 0.9% by weight sodium chloride solution is introduced for the surface of the liquid to be level with the filter plate surface without the surface of the filter plate being wetted. A round filter paper 90 mm in diameter and <20 μm in pore size (S&S 589 Schwarzband from Schleicher & Schüll) is subsequently placed on the ceramic plate. The Plexiglas cylinder holding swellable hydrogel-forming polymer is then placed with plastic plate and weight on top of the filter paper and left there for 60 minutes. At the end of this period, the complete unit is taken out of the Petri dish from the filter paper and then the weight is removed from the Plexiglas cylinder. The Plexiglas cylinder holding swollen hydrogel is weighed out together with the plastic plate and the weight is recorded as $W_b$.

Absorbency Under Load (AUL) is Calculated as Follows:

$$AUL0.7 psi [g/g]=[W_b-W_a]/[W_a-W_0]$$

Absorbency Under Load (AUL) 0.3 Psi (2070 Pa)

The measurement is carried out similarly to AUL 0.3 psi. The weight of the plastic plate and the weight together amount to 576 g.

Brandschacht Test 2.4 kg of softwood shavings 1.5 to 5 mm in size are mixed with 2.4 kg of the composition and dried in a forced-air cabinet for 16 hours. The dried mixture is uniformly distributed into four rectangular, shallow troughs (190 mm×1000 mm) with detachable bottom plate. The fill level is about 50 mm. The wood shavings are fixed with a wire net (mesh size 2 to 4 mm).

The Brandschacht test was carried out in accordance with German standard specification DIN 4102.

EXAMPLES

Example 1

A Lödige VT 5R-MK plowshare kneader (5 l in capacity) was charged with 1 000 g of deionized water and 810 g of acrylic acid. This initial charge was inertized by having nitrogen bubbled through it for 20 minutes. It was then neutralized with 263 g of a 48% by weight, likewise inertized potassium hydroxide solution. This was followed by the addition of 0.65 g of pentaerythritol triallyl ether and 10 g of sorbitan monolaurate. Dilute aqueous solutions were than added of 2.7 g of sodium persulfate (dissolved in 15.3 g of water and 0.024 g of ascorbic acid dissolved in 4.8 g of water) to initiate the polymerization at about 23° C. After the maximum temperature had been reached, the batch was stirred for a further 15 minutes. The hydrogel obtained was subsequently postneutralized with 527 g of a 48% by weight potassium hydroxide solution. The ultimately obtained crumbly gel was then dried in a forced-air cabinet at 160° C. for about 3 hours.

The dried base polymer was ground and classified to 106-850 μm by sieving off over- and undersize.

100 g of the dried base polymer were introduced as an initial charge into a Waring laboratory mixer equipped with an attachment having blunt mixing blades. At a moderate number of revolutions per minute, a syringe was then used to slowly inject (through a hole in the lid of the mixing attachment) 0.07 g of ethylene glycol diglycidyl ether dissolved in 2 g of 1,2-propanediol and 1 g of water with stirring in order that the base polymer may be wetted as uniformly as possible.

The moistened polymer was homogenized by stirring and then heat treated on a watchglass in a forced-air cabinet at 150° C. for 60 minutes. It was finally sieved through a 850 μm sieve to remove lumps.

Centrifuge retention capacity of the postcrosslinked polymer was determined in different solutions.

TABLE 1

Centrifuge retention capacity in different solutions

| Aqueous test solution | Centrifuge retention capacity [g/g] |
|---|---|
| 0.9% by weight NaCl | 25 |
| 10% by weight tripotassium citrate | 16.8 |

Example 2

A fire-extinguishing and/or fire-retarding composition was produced by stirring the components into water. The composition comprised 1% by weight of water-absorbing polymer as per Example 1, 10% by weight of tripotassium citrate, 0.2% by weight of xanthan thickener, 0.12% by weight of polyethylene glycol solubilizer, 0.2% by weight of Acticide® MBS biocide and water.

The fire-extinguishing and/or fire-retarding composition was subjected to a Brandschacht test.

After the Brandschacht test, the underside of the samples was substantially unchanged (only minimal traces of carbonization). No afterglow was observed. Smoke density during the test was low (light absorption). The results are summarized in table 2.

Example 3 (Comparative)

Example 2 was repeated with a fire-extinguishing and/or fire-retarding composition based on a 20% by weight ammonium pyrophosphate solution.

After the Brandschacht test, the underside of the samples was virtually completely carbonized. After the test, the sample still afterglowed for 5 hours and was completely consumed in the process. Smoke density during the test was moderate (light absorption). The results are summarized in table 2.

TABLE 2

Results of Brandschacht test to DIN 4102

| | Example 2 | Example 3 (comparative) |
|---|---|---|
| Max. flame height [cm] | 60 | 120 |
| Light absorption [% × min] | 1 | 115 |
| Average residual length [cm] | 22 | 0 |
| Ignition of surface [s] | 40 | 1 |

We claim:

1. A fire-extinguishing and/or fire-retarding composition comprising at least one water-absorbing polymer having a centrifuge retention capacity of not less than 15 g/g and at least one alkali metal salt of a nonpolymeric saturated carboxylic acid.

2. The composition according to claim 1 further comprising a thickener.

3. The composition according to claim 1 wherein the water-absorbing polymer is a partially neutralized crosslinked polyacrylic acid.

4. The composition according to claim 1 wherein the alkali metal salt is a sodium or potassium salt.

5. The composition according to claim 1 wherein the alkali metal salt is tripotassium citrate.

6. The composition according to claim 1 further comprising a foaming agent.

7. The composition of claim 1 wherein a ratio of the at least one water-absorbing polymer to the at least one alkali metal salt of the nonpolymeric saturated carboxylic acid is in a range from 1:2 to 1:50.

8. The composition of claim 1 comprising from 0.5% to 2%, by weight, of the at least one water-absorbing polymer and from 5% to 40%, by weight, of the at least one alkali metal salt of the nonpolymeric saturated carboxylic acid.

9. The composition according to claim 1 further comprising water.

10. The composition according to claim 9 further comprising a thickener.

11. The composition according to claim 10 further comprising a foaming agent.

12. The composition according to claim 9 wherein the water-absorbing polymer is a partially neutralized crosslinked polyacrylic acid.

13. The composition according to claim 12 wherein the alkali metal salt comprises tripotassium citrate.

14. The composition according to claim 9 wherein the alkali metal salt comprises tripotassium citrate.

15. A textile material coated with a fire-retarding composition according to claim 1.

16. A building material coated with a fire-retarding composition according to claim 1.

17. An article of manufacture comprising a composition of claim 1.

18. The article of claim 17 selected from the group consisting of an extinguisher, an extinguishing fitting, and an extinguishing system.

19. A fire-extinguishing and/or fire-retarding composition consisting essentially of at least one water-absorbing polymer having a centrifuge retention capacity of not less than 15 g/g and at least one alkali metal salt of a nonpolymeric saturated carboxylic acid.

20. A method of fighting a fire comprising applying a composition of claim 1 to the fire.

21. The method of claim 20 wherein the fire is a forest fire, a tire warehouse fire, a landfill fire, a coal stack fire, or a mine fire.

22. The method of claim 20 wherein the fire is fought from the air.

23. A method of imparting fire resistance to an article comprising:
(a) applying a composition of claim 1 and water to the article; and
(b) allowing the applied composition to dry on the article and form a fire-retarding coating on the article.

24. The method of claim 23 wherein the article is a textile material, a building material, or a structural component.

* * * * *